(12) United States Patent
Duineveld et al.

(10) Patent No.: US 10,959,569 B2
(45) Date of Patent: Mar. 30, 2021

(54) HEATING DEVICE FOR HEATING FOOD IN A CONTAINER, IN PARTICULAR MILK IN A BABY BOTTLE

(71) Applicant: KONINKLIJKE PHILIPS N.V., Eindhoven (NL)

(72) Inventors: Paulus Cornelis Duineveld, Eindhoven (NL); Arjan Teodor Van Wieringen, Eindhoven (NL); Jingqi Hou, Eindhoven (NL); Roel Alexander Rethmeier, Eindhoven (NL); Franciscus Maria Johannes Van Roemburg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 265 days.

(21) Appl. No.: 15/310,807

(22) PCT Filed: May 4, 2015

(86) PCT No.: PCT/EP2015/059670
§ 371 (c)(1),
(2) Date: Nov. 14, 2016

(87) PCT Pub. No.: WO2015/173042
PCT Pub. Date: Nov. 19, 2015

(65) Prior Publication Data
US 2017/0086620 A1 Mar. 30, 2017

(30) Foreign Application Priority Data
May 14, 2014 (EP) ..................................... 14168244

(51) Int. Cl.
*A47J 36/24* (2006.01)
*A47J 36/32* (2006.01)

(52) U.S. Cl.
CPC ............. *A47J 36/2438* (2013.01); *A47J 36/32* (2013.01)

(58) Field of Classification Search
CPC ........ A47J 36/32; A47J 27/12; A47J 37/1219; A47J 37/106; A47J 37/1228;
(Continued)

(56) References Cited

U.S. PATENT DOCUMENTS 2,516,637 A 7/1950 McCollum
4,595,827 A * 6/1986 Hirai .................... F24C 7/08
219/144

(Continued)

FOREIGN PATENT DOCUMENTS

| EP | 1475107 A1 | 11/2004 |
| FR | 2305957 A1 | 10/1976 |
| GB | 2484750 A | 4/2012 |

*Primary Examiner* — Tu B Hoang
*Assistant Examiner* — Masahiko Muranami

(57) ABSTRACT

The present invention relates to a heating device (100, 200) for heating food (4) in a container (3), in particular milk in a baby bottle. The heating device comprising a chamber (1) configured to contain a fluid (2) and to receive the container (3), a heating unit (5) for heating the fluid, a temperature measuring element (8) for measuring the temperature of the fluid (2) over time to obtain a temperature profile (300) over time, and a controller (6) for controlling the heating unit (5) based on the obtained temperature profile of the fluid.

19 Claims, 6 Drawing Sheets

(58) Field of Classification Search
CPC ...... A47J 36/2438; A47J 37/049; A47J 37/08; A47J 37/0835; A47J 37/0871; A47J 27/62
USPC ................. 99/330, 331, 334, 325, 326, 337; 219/430, 432
See application file for complete search history.

(56) References Cited

U.S. PATENT DOCUMENTS

| | | | | |
|---|---|---|---|---|
| 4,839,503 | A * | 6/1989 | Wolf | A47J 27/62 219/497 |
| 5,281,426 | A * | 1/1994 | Pardo | A23L 3/10 426/232 |
| 6,417,498 | B1 * | 7/2002 | Shields | A47J 36/2427 219/386 |
| 6,440,361 | B2 * | 8/2002 | Weng | A23L 3/003 422/105 |
| 2003/0222075 | A1 * | 12/2003 | Binet | A47J 27/06 219/430 |
| 2004/0140304 | A1 | 7/2004 | Leyendecker | |
| 2006/0011613 | A1 * | 1/2006 | Rado | H05B 1/0263 219/494 |
| 2008/0199164 | A1 * | 8/2008 | Wortley | A47J 36/2438 392/444 |
| 2009/0208193 | A1 * | 8/2009 | Bauer | A47J 36/2433 392/382 |
| 2012/0251695 | A1 * | 10/2012 | Neff | A47J 27/004 426/509 |
| 2013/0048625 | A1 * | 2/2013 | Sladecek | A47J 36/321 219/494 |
| 2014/0026762 | A1 * | 1/2014 | Riefenstein | H05B 6/6441 99/325 |

* cited by examiner

HEATING DEVICE FOR HEATING FOOD IN A CONTAINER, IN PARTICULAR MILK IN A BABY BOTTLE

This application is the U.S. National Phase application under 35 U.S.C. § 371 of International Application No. PCT/EP2015/059670, filed on May 4, 2015, which claims the benefit of International Application No. 14168244.3 filed on May 14, 2014. These applications are hereby incorporated by reference herein.

FIELD OF THE INVENTION

The present invention relates to a heating device for heating food in a container, in particular milk in a baby bottle. The present invention relates particularly to a bottle warmer for warming milk in a baby bottle. Further, the present invention relates to a control method.

BACKGROUND OF THE INVENTION

Heating up food, in particular milk, to an acceptable temperature is an essential part of the nutrition cycle for young babies. This can either be breast milk that is stored in the fridge or formula milk that is prepared from tap water or cooled down boiled water. An acceptable temperature for the milk is for most babies between 30 and 40-42° C. and more preferably between 35 and 39° C. Research shows that if the milk temperature is over 40° C. for more than 20 minutes, then the essential nutrition parts such as proteins and vitamins will be damaged.

There are several different methods of heating-up milk or food. These can be microwave heating, steam heating and water bath heating (also known as au bain-marie heating). Microwave heating method has the disadvantage that heating is not uniform in the milk and locally the milk can become very hot, causing nutrition damage. With steam heating steam is condensing on the bottle wall. It has however a disadvantage that the milk temperature inside the milk can be non-homogeneous, also resulting in parts (at the top of the bottle) of the milk that can become too hot. This is also noticed by consumers.

The au bain-marie principle is heating of milk by placing the milk in a container, in particular a baby bottle, in liquid, in particular water, which is heated via a heating element at the bottom of a chamber. This is the most common technology being used in many heating devices. One of the essential advantages of an au bain-marie system is that the heating of the milk goes relatively uniform, i.e. there is only a small temperature gradient in the milk.

Currently, the user has to roughly define by trial and error the heating time of the baby bottle in the chamber in order to achieve the desired milk temperature. When the baby bottle is not taken out in the right time interval the milk will continue to heat up. As there is a tremendous variation in baby bottle types, sizes, milk and water volume, baby bottle wall thickness and initial milk and water temperature it is not possible for a manufacturer to give accurate advice in the manual on how long the baby bottle should be heated to achieve the required temperature.

An essential problem for a bottle warmer is that the milk temperature inside the bottle is not known. It appears rather difficult to measure the milk temperature directly in the bottle. There are bottles with temperature indicators, however these are relatively inaccurate. Further it is very difficult to read these temperature indicators when the milk is in the bottle warmer.

US 2004/0140304 A1 discloses a device for chilling and warming a baby bottle in a single chamber, the device comprising a chamber configured to contain a fluid and to receive a container, the heating unit for heating the fluid, a temperature measuring element for measuring a temperature of the chamber and a controller for controlling the heating unit.

SUMMARY OF THE INVENTION

It is an object of the present invention to provide a heating device for heating food in a container, in particular milk in a baby bottle, in a fast and reliable way without the risk of overheating the food in the container. It is a further object to provide a corresponding control method.

In a first aspect of the present invention a heating device for heating food in a container, in particular milk in a baby bottle, is presented comprising
a chamber configured to contain a fluid and to receive the container,
a heating unit for heating the fluid,
a temperature measuring element for measuring the temperature of the fluid over time to obtain a temperature profile over time, and
a controller for controlling the heating unit based on the obtained temperature profile of the fluid,
wherein the controller is configured to control the heating unit based on the temperature profile of the fluid and based on the amount of fluid.

In a first aspect of the present invention a control method for heating device disclosed herein for heating food in a container, in particular milk in a baby bottle, is presented, said control method comprising:
receiving temperature profile over time, said temperature profile representing the measured temperature of fluid contained in a chamber configured to receive the container over time
controlling the heating of the fluid,
wherein the controlling of the heating unit is based on the obtained temperature profile of the fluid and based on the amount of fluid.

In yet further aspects of the present invention, there are provided a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, processor, computer program and medium have similar and/or identical preferred embodiments as the claimed device and as defined in the dependent claims.

The present invention is based on the idea that with the knowledge of the temperature of the fluid over time and the behavior of the temperature of the fluid, the food temperature can automatically be estimated rather exactly. In this way, the milk can be heated up evenly without the risk of overheating. The fluid as used according to the present invention can have different aggregate states and can be a liquid, e.g. water, or a gas, e.g. air. The present invention gives a simple method to heat up the milk to a desired or predefined temperature with requiring the use to estimate or test the food temperature or make a guess of the required heating duration in advance. Further, no communication with the user or direct milk temperature measure is required. Still further, the food can be easily kept warm after the predefined temperature is reached. While ensuring nutrient safe heating, the present invention considers the heating time and avoids a long time waiting to reach the desired or predefined temperature. The invention thereby makes use of the effects that the food can still be heated while the heating unit is turned off and that the food temperature will not excess the fluid temperature.

It shall be noted that the present invention is not limited to the heating of milk in a baby bottle, but can generally be used for heating food in a container, e.g. other liquids like tea in a bottle or drinking glass or baby food in a food glass. Further, it shall be noted that heating food shall not only be understood as warming up food to a temperature comfortable or appropriate for consumption, but does also include to defrost food from a frozen state into a non-frozen state.

Preferably, the controller is configured to control the turn-off time, the turn-on time and/or the power of the heating unit. This allows a more precise control of the food temperature.

It has been recognized that the temperature gradient of the temperature profile is particularly useful for estimating the temperature of the food. Hence, in an embodiment the controller is preferably configured to control the heating unit based on a temperature gradient of the temperature gradient of the temperature profile, which also provides the ability for the controller to control the fluid temperature more accurately.

In a preferred embodiment the heating device further comprises a processor for estimating the temperature of the food based on the temperature profile of the fluid, the temperature gradient over time of the fluid and the turn-off time, turn-on time and/or power of the heating unit over time. The controller can thus be provided with estimated temperature data for accurately controlling of the turn-off time, turn-on time and/or power of the heating unit. Further the current temperature may be provided to the user via a user interface.

In a preferred embodiment the heating device further comprises a first measurement unit for measuring the amount of fluid in the chamber, wherein the controller is configured to control the heating unit based on the temperature profile of the fluid and based on the measured amount of fluid. In this way the controller can adjust the temperature of the food in the container more precisely.

In a preferred embodiment the heating device further comprises a second measurement unit for measuring the amount of food and/or the weight of the food and the container, wherein the controller is configured to control the heating unit based on the temperature profile of the fluid and based on the measured amount of food and/or the weight of the food and the container. In this way the controller can adjust the temperature of the food in the container more precisely and decrease the heating time.

In a preferred embodiment the heating device further comprises a user interface for enabling a user to set a desired temperature of the food and/or to select a predefined warming program. Various options can thus be provided to the user for his selection. The options may also be provided for different kinds of food to be heated.

Preferably, the user interface is configured to issue information regarding the amount of fluid to be filled in the chamber by using the measurement from the second measurement unit. In this way the food can be warmed more precisely and uniformly over time.

In a preferred embodiment the heating device further comprises a detection unit for detecting one or more properties and/or the type of the food in the container, wherein the controller is configured to control the heating unit based on the temperature profile of the fluid and based on the detected one or more properties and/or the type of the food. With the knowledge, the controller can run a warming program without any user input. For detection of the food various options can be applied, e.g. optical detection.

Preferably, the chamber is configured to receive a fluid and/or is pre-filled with fluid. The latter option prevents user mistakes by forgetting to fill the fluid into the chamber or to fill in the wrong amount.

In a preferred embodiment the heating device further comprises a signaling unit for outputting a signal upon reaching a predefined temperature of the food. In this way the user knows when the food reached the predefined temperature and the user does not need to wait longer than needed. Preferably, the signaling unit is configured to issue an optical signal, an acoustical signal and/or a vibration signal, but other option may exist as well.

Further, the controller is preferably configured to control the heating unit to perform heating of the fluid in different heating phases. This allows a more precise control of the food temperature.

In one embodiment, the controller is configured to control the heating unit to perform heating of the fluid in a first heating phase for a predefined time, for a calculated time, until the fluid reaches a first predefined temperature or until the fluid reaches a first temperature, which is by a predefined percentage or absolute value higher than an initial fluid temperature at the beginning of the first heating phase. Hence, in said first heating phase different conditions may be used for the control of the heating units.

In another embodiment, the controller is configured to control the heating unit to perform heating of the fluid in a second heating phase, which is initiated when the fluid temperature becomes constant, is only rising below a predetermined degree or starts falling after the end of the first heating phase. This enables a control of the food temperature with a high preciseness.

In still another embodiment, the controller is configured to control the heating unit to perform heating of the fluid in a third heating phase in case the fluid temperature approaches or falls below a predefined or desired temperature of the food by heating the fluid to a temperature above or equal to the predefined or desired temperature of the food. This third heating phase is preferably used for keeping the food temperature constant after it has been heated to the desired or predefined temperature before in the second heating phase.

Thereby, the controller is preferably configured to control the heating unit to perform heating of the fluid in the third heating phase by repeatedly turning on and off the heating unit for two or more time intervals until the fluid temperature rises above or reaches the predefined or desired temperature of the food. This provides that the food is not overheated and even damaged.

In another preferred embodiment the heating device further comprises a third measurement unit for measuring the temperature of the environment around the heating device, wherein the controller is configured to control the heating unit based on the temperature profile of the fluid and based on the measured temperature of the environment around the heating device. This allows a more precise control of the food temperature.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
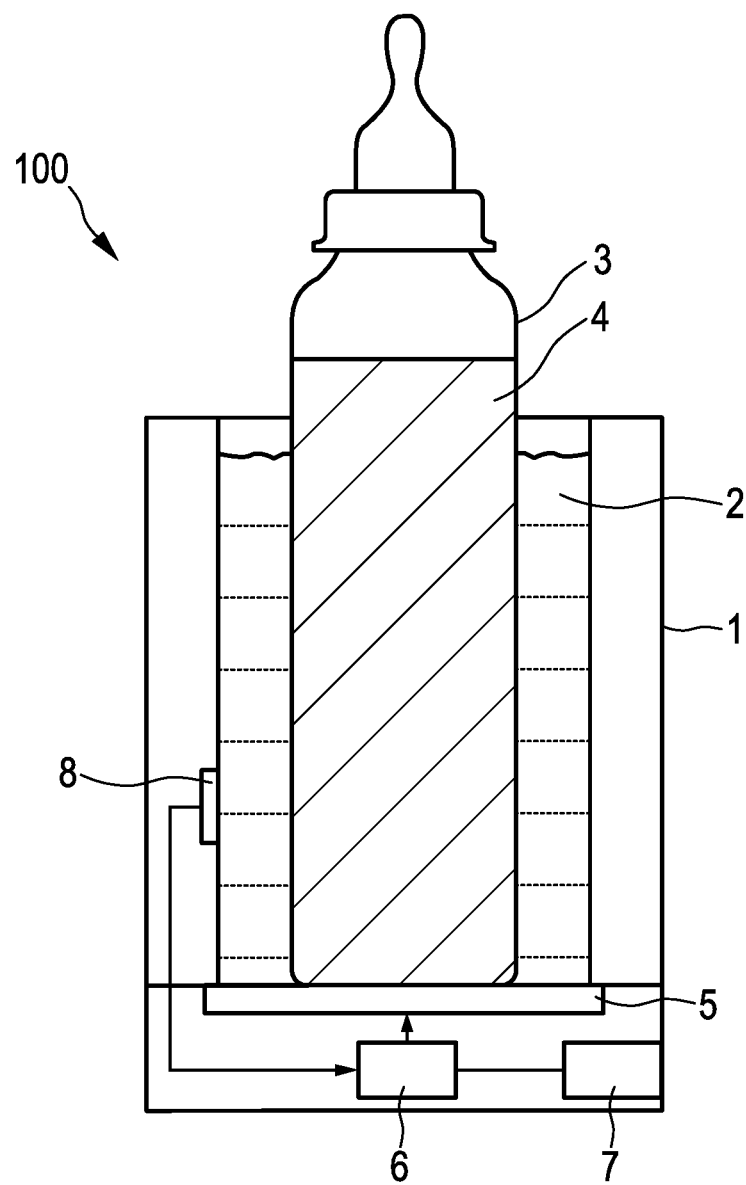
FIG. 1 shows a schematic representation of a first embodiment of the heating device according to the present invention.

FIG. 1 shows a schematic representation of a first embodiment of the heating device 100. The heating device 100 comprises a chamber 1 which is configured to contain a fluid 2 and to receive a container 3 containing food 4. The container 3 can e.g. be a baby bottle, a jar, etc. containing e.g. milk, tea or baby food, which is shall be heated. The container 3 can be made from different materials e.g. glass, metal or plastic. The fluid 2 in the chamber 1 is preferably water, which is preferred due to its high heat capacity and big amount. However, other liquids with low viscosity and even gas (e.g. filled into a space within a double wall chamber, e.g. which is sealed) can be used. The heating device 100 further comprises a heating unit 5, e.g. heating element such as a heating coil, heating plate, thermostat and/or heating rod, for heating the fluid 2 in the chamber 1. Said heating unit 5 is driven by a controller 6 (described in more detail below) preferably using a power unit 7 provided with energy from an external power source or a battery or accumulator. The heating device 100 further comprises a temperature measuring element 8, e.g. an NTC (negative temperature coefficient) or a PTC (positive temperature coefficient) temperature measuring element 8, for measuring the temperature of the fluid 2.

The controller 6, which may comprise or be realized by a processor, controls the heating unit 5 based on a temperature profile of the fluid 2 representing the temperature of fluid 2 over time as measured by the temperature measuring element 8. In particular the temperature gradient of the temperature profile is evaluated. For this purpose the controller 6 is preferably configured control the turn-off time, the turn-on time and/or the power of the heating unit 5 for obtaining a predefined or desired temperature of the food 4 in the container 3. The provided control prevents damage to the food 4 in case of high temperatures by staying below or exactly at the predefined or desired temperature of the food, although the fluid is heated above the predefined or desired temperature. At the same time a very precise heating is possible so that the user does not need to estimate the required heating time.

Figure 2:
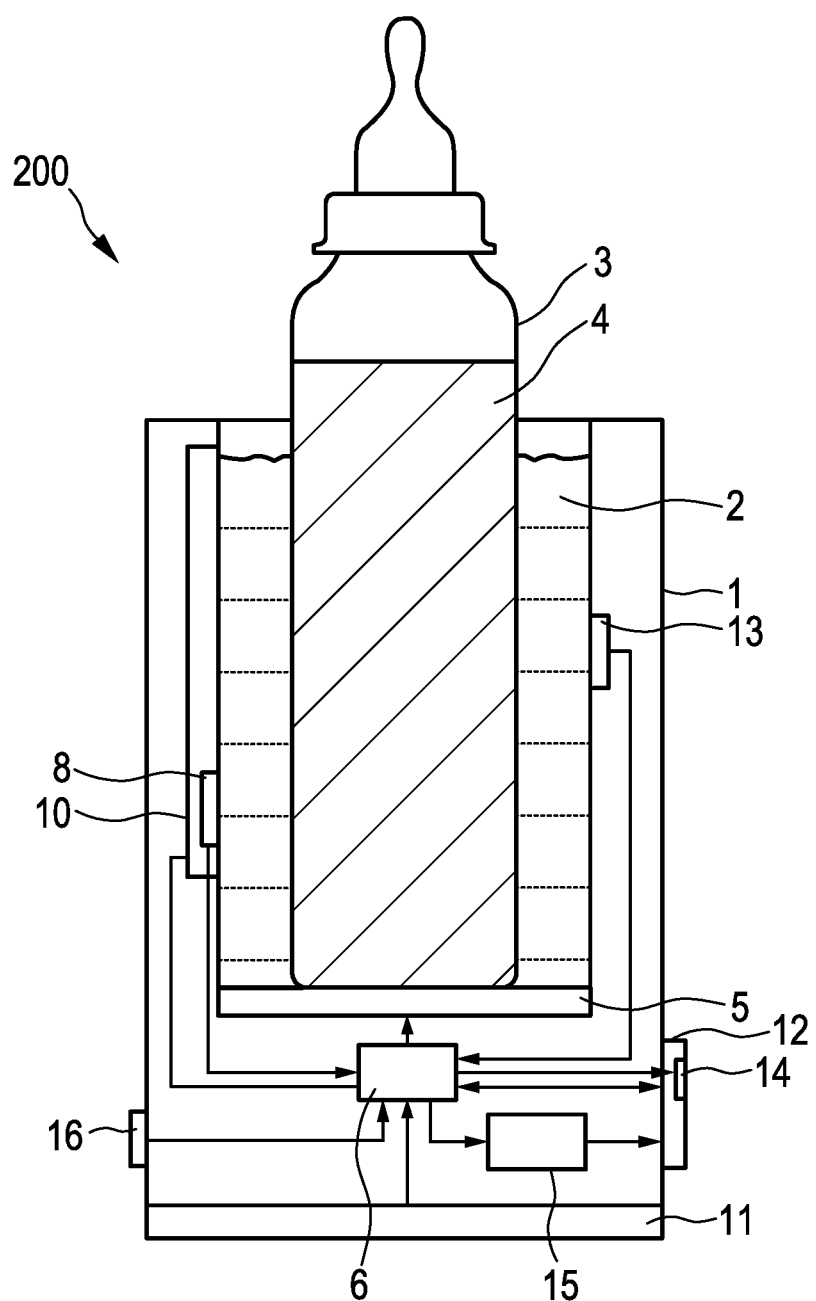
FIG. 2 shows a schematic representation of a second embodiment of the heating device according to the present invention.

A schematic representation of a second embodiment of the heating device 200 is shown in FIG. 2. Compared to the heating device 100 the heating device 200 comprises additional elements. It shall be noted, however, that other embodiments of the heating device may comprise other combinations of elements, e.g. may only comprise one or more of the additional elements.

The heating device 200 further comprises a first measurement unit 10 for measuring the amount of fluid 2 in the chamber 1. The first measurement unit 10 uses e.g. a glass float or a vibration probe or optically detects the level of the fluid 2 within the chamber 1. The measured amount of fluid 2 in the chamber 1 is then taken into account by the controller 6 in the estimation of the temperature of the food 4 and the control of the heating unit 5, which can thus be done more precisely and/or faster.

The heating device 200 further comprises a second measurement unit 11 for measuring the amount of food 4 and/or the weight of the food 4 and the container 3. The measured information is then taken into account by the controller 6, e.g. in combination with the information of amount of fluid 2 in the chamber 1 as measured by the first measurement element 10, in the estimation of the temperature of the food 4 and the control of the heating unit 5, which can thus be done more precisely and/or faster.

The heating device 200 further comprises a third measurement unit 16 for measuring the temperature environment around the heating device. The measured information is then taken into account by the controller 6, e.g. in combination with the information of amount of fluid 2 in the chamber 1 as measured by the first measurement element 10 and/or with the information of the amount of food 4 and/or the weight of the food 4 and the container 3 as measured by the second measurement element 10, in the estimation of the temperature of the food 4 and the control of the heating unit 5, which can thus be done more precisely and/or faster. The third measurement unit is e.g. an NTC or a PTC element.

The heating device 200 further comprises a user interface 12. The user interface 12 is preferably used for various purposes, in particular for receiving user input and/or for providing information to the user. For instance, the user interface is used enabling a user to set a desired temperature of the food 4 and/or to select a predefined warming program, to indicate which kind of food 4 is in the container 3, to provide the user with the information about how much fluid 2 should be filled in the chamber 1, to provide the user with the current food 4 temperature etc. The user interface 12 may e.g. comprise a display, a knob, one or more buttons, a touchscreen, one or more lamps (e.g. LEDs), etc.

The heating device 200 further comprises a detection unit 13 for detecting one or more properties and/or the type of the food 4 in the container 3. For this purpose the detection unit 13 may e.g. use an optical sensor or a camera. In a simple detection liquid food (e.g. tea or milk) may be distinguished from more solid food like mush, or milk (showing only white color) may be distinguished from other food (showing other colors). By using the detected data from the detection unit 13 the estimate temperature of the food 4 and the control of the heating unit 5 can be done more precisely and/or faster. It is also possible that the controller 6 sets the desired temperature automatically by using common or preset temperatures for the detected one or more properties and/or the detected type of the food, which may be stored in a look-up table used by the controller 6.

The heating device 200 further comprises a signaling unit 14, preferably as part of the user interface 12, for outputting a signal upon reaching the predefined temperature and/or the desired temperature. The signaling unit 20 may e.g. be a lamp (e.g. an LED), a speaker or a vibration element.

Still further, the heating device 200 may further comprise a processor 15 for estimating the temperature of the food 4 based on the temperature profile of the fluid 2, the temperature gradient over time of the fluid 2 and the turn-off time, turn-on time and/or power of the heating unit 5 over time. The estimated temperature may then be issued via the user interface 12 in order to inform the user about the current heating status.

Figure 3:
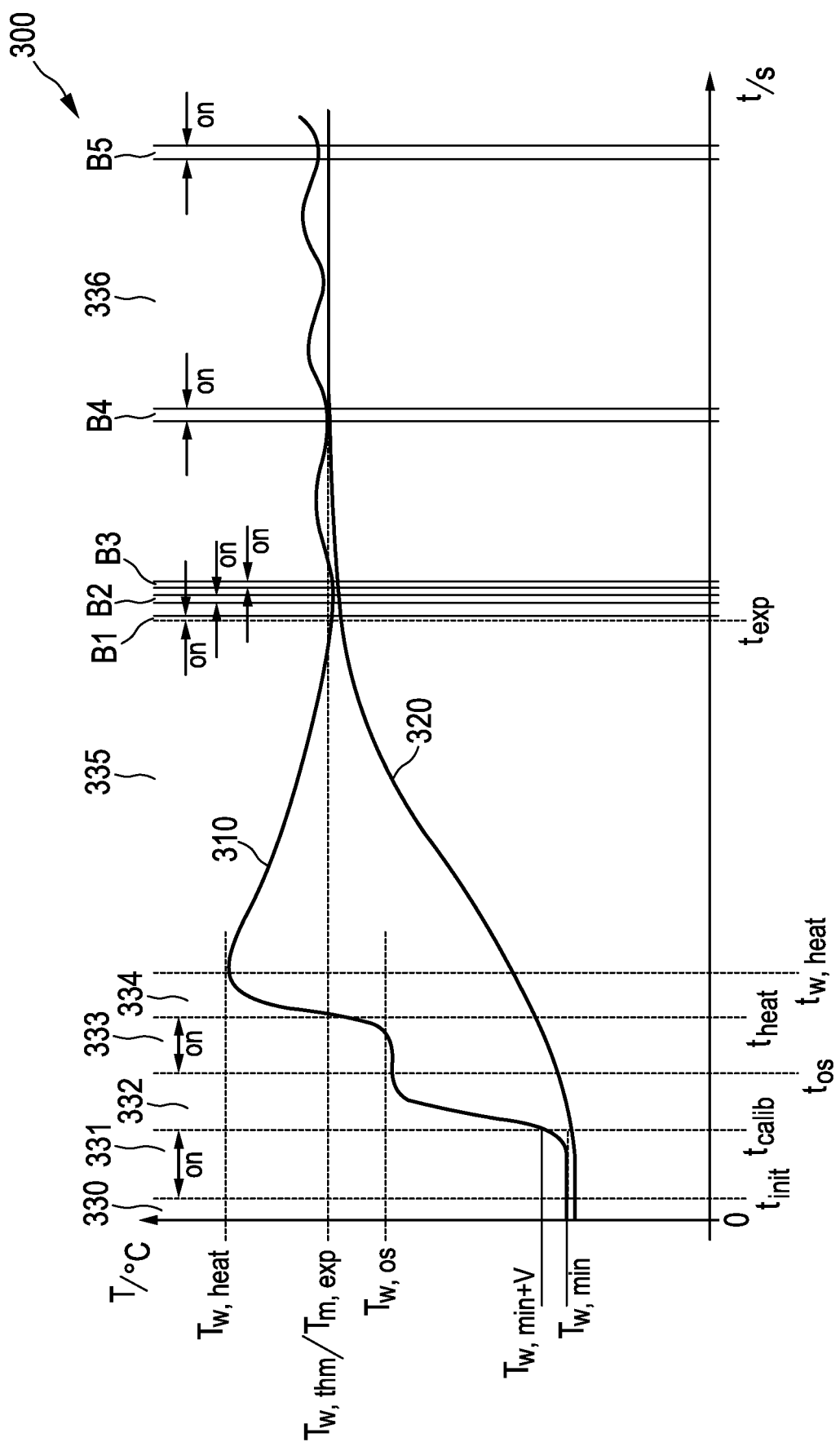
FIG. 3 shows a diagram of a temperature profile over time according to the present invention.

A diagram of a temperature profile 300, representing the temperature T (in ° C.) over time t (in seconds), as obtained and used according to the present invention is shown in FIG. 3. The diagram shows two curves 310, 320. The first curve 310 represents the (measured) fluid temperature over time, and the second curve 320 represents the (estimated) food temperature over time.

The control method applied by the controller according to the present invention is mainly based on thermal knowledge. The proposed method preferably provides on/off decisions to the heating unit to ensure the milk reaches the pre-set temperature in a nutrient safe and relatively fast manner. By preferably combining the gradient of the fluid temperature and the heating interval, the time when the food reaches the pre-set temperature can be estimated (but needs not necessarily be estimated according to the present invention).

In order to cope with a large variety of scenarios appearing in practice, the controller 6 preferably applies a piecewise heating function having different heating phases, which will be explained piece by piece in the following. The main phases are also referred to as calibration, overshoot, heating, cooling, and thermostat. Before the calibration phase (also called first heating phase) an initial phase may be provided for preparation (but generally without heating).

The temperature profile 300 shown in FIG. 3 shall now be explained in more detail. An initial phase 330 runs from t=0 to t=$t_{init}$. An initial phase is needed sometimes e.g. for booting the controller 6 and/or the processor 15 and to start measuring the fluid temperature with the temperature measuring element 8.

A first heating phase 331, also called calibration heating phase, runs from t=$t_{init}$ to t=$t_{calib}$. During the calibration heating phase the heating unit 5 is turned on (indicated by the indication "on" in FIG. 3. The calibration heating phase initially includes a waiting time, which is the time in which the heating unit 5 is turned on and the fluid temperature does not yet increase. This due to the time needed for heating up the heating unit 5 and due to the fact that the temperature of a fluid does generally not immediately increase after starting to heat it. Therefore, the calibration heating phase should be longer than the waiting time. After the waiting time, the fluid temperature increases almost linearly and the gradient of the fluid is determined mainly by the power of the heating unit 5 and the amount of fluid 2 in the chamber 1 (e.g. the water mass in case of water as fluid). The heating unit 5 is turned off when the fluid temperature has increased by a predetermined value of e.g. 2° C. (marked as $T_{w,min+V}$) above the initial minimum fluid temperature $T_{w,min}$ which is measured initially, e.g. during the initial phase (e.g. at t=0) or at the beginning of the calibration heating phase (i.e. at t=$t_{init}$). The further computation is based on the linear relationship between the increase of the fluid temperature and the time.

After the calibration heating phase 331 an overshoot phase 332 begins running from t=$t_{calib}$ to t=$t_{os}$. During the overshoot phase 332 the fluid temperature will not stop increasing although the heating unit 5 is off. There is still remaining heating energy going into the fluid 2 and other parts, causing the further increase of the fluid temperature. The overshoot phase 332 is the phase to wait for the further climbing of the fluid temperature and measuring the fluid temperature. The maximum temperature at which the fluid temperature is not increasing anymore is marked as $T_{w,os}$, which is reached at time $t_{os}$.

If the heating unit 5 is controlled by controller 6 with a constant power, the total heating energy issued by the heating unit 5 should linearly correspond to the heating time. Most of the heating energy is used to heat up the fluid 2 during the calibration heating phase 331 and the overshoot phase 332. Therefore, there is the following relationship:

$$pow \times (t_{calib} - t_{init}) = M_w \times Cp_w \times (T_{w,os} - T_{w,min}).$$

where pow is the power of the heating unit 5, $t_{calib}$ is the time when the calibration heating phase 331 stops, $t_{init}$ is the time when the calibration heating phase 331 starts, $M_w$ is the amount of fluid 2 calculated with the fluid mass, and $Cp_w$ is the specific heat capacity of the fluid 2.

For a further explanation an overshoot rate OSR will be defined as OSR=$(T_{w,os} - T_{w,min})/(t_{calib} - t_{init})$. The OSR should linearly correspond to the fluid mass $M_w$. The fluid mass and the power of the heating unit 5 are usually constant during the whole heating procedure, so that OSR is unique for each case. It is used to determine the time of heating during a subsequent second heating phase 333.

The second heating phase 333 runs from $t_{os}$ to $t_{w,heat}$. After the overshoot phase 332 the second optional heating phase starts when the fluid temperature is not increasing any more at temperature $T_{w,os}$. The second heating phase 333 starts with turning the heating unit 5 on and ends when the fluid temperature is not increasing any more at temperature $T_{w,heat}$. The time duration of the second heating phase be determined by the relationship $$\Delta t_{heat} = t_{heat} - t_{os} = (T_{w,heat} - T_{w,os})/OSR$$

where $T_{w,heat}$ is the temperature which is aimed at after the second heating phase and which is e.g. based on experimental data in relation to the predefined and/or desired food temperature $T_{m,exp}$ as will be described below After the second heating phase 333, a second overshoot phase 334 starts from $t_{heat}$ to $t_{w,heat}$ during which the fluid temperature increases faster than the food temperature although the heating unit 5 is switched off.

When the temperature does no longer increase at $T_{w,heat}$ a cooling phase 335 starts. The cooling phase 335 runs from t=$t_{w,heat}$ to t=$t_{exp}$. The fluid 2 contains temperature energy that is used to further heat up the food. By heating the food 4 with the temperature energy of the fluid 2, the fluid 2 itself is cooling. The temperature energy in the fluid 2 allows that the food temperature ends roughly at the desired and/or predefined temperature $T_{m,exp}$ at t=$t_{exp}$. During the cooling phase 335, the heating unit 5 is switched off. The cooling phase 335 ends when the fluid temperature falls to the temperature $T_{w,thm}$. $T_{w,thm}$ is defined as the same temperature as $T_{m,exp}$ or e.g. 1° C. more than $T_{m,exp}$.

After the cooling phase 335 a third heating phase 336, also called thermostat heating phase, starts at t=$t_{exp}$ and ends when the user switches off or unplugs the heating device. During the thermostat heating phase 336 the equilibrium between the fluid temperature and the food temperature shall be reached and maintained. The food temperature shall remain constantly at the predefined or desired temperature. This is achieved by turning the heating unit 5 on for one (or more) short heating boost(s) B1 (e.g. of a duration of one second) if the fluid temperature cools below $T_{m,exp}$. If the water temperature still does not increase after a first boost, one or more further short boosts B2, B3 are applied by turning the heating unit 5 on until the fluid temperature is above or exactly at $T_{w,thm}$. When the fluid temperature drops again this procedure repeated and further boosts B4, B5 may be applied. In this way the food temperature can be kept substantially constant at a desired or predefined temperature for some time without any risk of overheating the food.

In the embodiment explained above with respect to FIG. 3 a particular example for the various conditions used for starting or ending a particular phase is given. In other embodiments other conditions and/or values different from the above mentioned exemplary values used in the explained conditions may be applied.

For instance, in an embodiment the time duration of the first heating phase 331 may be predefined, e.g. in the range between 5 and 60 seconds. Alternatively, the end of the first heating phase 331 may be determined by reaching a predefined percentage of the initial minimum temperature $T_{w,min}$, e.g. in the range between 10 and 100%, or by reaching a predefined absolute increase of the initial minimum temperature $T_{w,min}$, e.g. in the range between 1 and 10° C. In real use scenarios, there are lots of variations. For instance, if in a glass narrow neck bottle with little amount of milk and the room/milk/water temperatures are all relatively high (e.g. 25° C.), then the heating time can be very short; on the other hand, if a large amount of milk shall be defrosted, the time can be much longer.

In a further embodiment, the second heating phase 333 may be started after the calibration heating phase 331 when the fluid temperature is still rising after the first heating phase by with a reducing gradient or when the fluid temperature already starts falling.

In another embodiment, the time duration of the second heating phase 333 may, similar as the time duration of the first heating phase 331, be defined by reaching a predefined percentage of the temperature $T_{w,os}$ at the beginning of the second heating phase 333, e.g. in the range between 10 and 100%, or by reaching a predefined absolute increase of the temperature $T_{w,os}$, e.g. in the range between 1 and 10° C. Again, large use scenario variations cause a large range of the heating cycle.

In still another embodiment, the third heating phase 336 may be started after the cooling phase 335 when the predefined or desired temperature of the food and/or the fluid temperature is close to the predefined or desired temperature of the food, i.e. not necessarily exactly the predefined or desired temperature, but reaches a predefined absolute value (e.g. in the range of up to 3° C.) or a predefined percentage (e.g. in the range of up to 10%) above or below the predefined or desired temperature.

In still a further embodiment, the third heating phase 336 may generally comprise one or more short heating boost, wherein the time duration of the heating boost and the time in between heating boost may be individually controlled and may also be different. In a preferred embodiment the time duration of such a heating boost is in the range from 0.5 to 5 seconds. (In some cases, in which e.g. the milk has already reached the pre-defined temperature, then heating will only start heating when the milk temperature drops below the pre-defined temperature again. For some cases, e.g. the extreme case of defrosting, there is still more energy needed after the previous two heating phases and in phase 336 the heating will boost very frequent.

Figure 4:
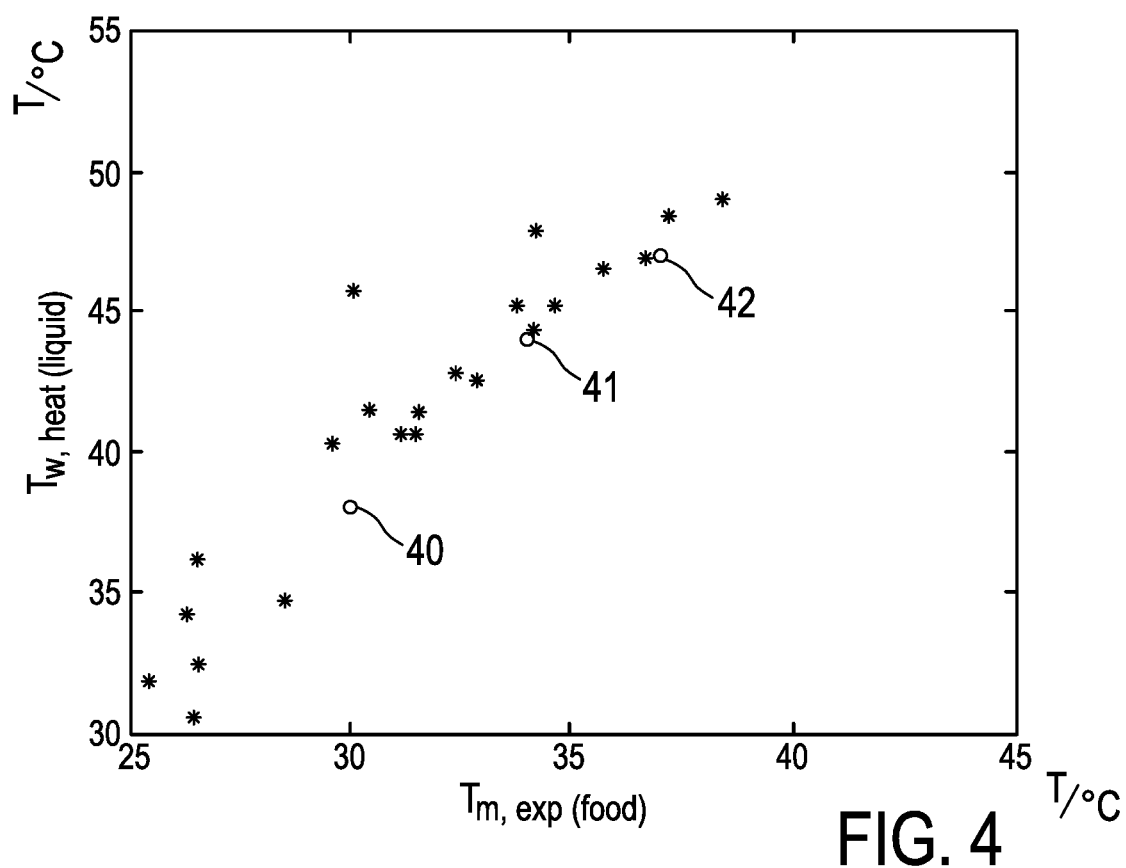
FIG. 4 shows a diagram of experimental temperatures of the fluid temperatures after heating the fluid and corresponding food temperatures after cooling phase.

A diagram of experimental temperatures $T_{w,heat}$ of the fluid after heating the fluid to the temperature $T_{w,heat}$ over the corresponding food temperatures $T_{m,exp}$ is shown in FIG. 4. In this experiment the fluid 2 is water and the food 4 is milk. Each star in the diagram represents an experiment with different amounts of water and/or milk, different initial water and/or milk temperatures and different turn on and off times of the heating unit 5. It can be seen that there is a correlation between $T_{w,heat}$ and $T_{m,exp}$. Therefore, it is possible to determine $T_{w,heat}$ from $T_m$,exp. In order to make sure that the milk is not overheated for all cases, the lower boundary of the experimental data is used to determine the relation instead of a linear regression for the controller 6 of the heating device. These lower boundaries are shown with three circles 40, 41, 42. A first circle 40 is set at $T_{m,exp}$=30° C. and $T_{w,heat}$=38° C. A second circle 41 is set at $T_{m,exp}$=34° C. and $T_{w,heat}$=44° C. A third circle 42 is set at $T_{m,exp}$=37° C. and $T_{w,heat}$=47° C. These circles 40, 41, 42 are examples for different predefined temperatures.

While the chamber can be prefilled with water, In an embodiment the user is asked to fill a predetermined amount of water into the chamber, e.g. the same amount as the amount of food he wants to heat up. This provides a very fast and precise way to heat the food to the predefined temperature. For instance, if a user chooses a predefined temperature of 34° C. for milk, the different heating phases heat the water to a temperature of $T_{w,heat}$=44° C. without the risk of overheating the milk.

Figure 5:
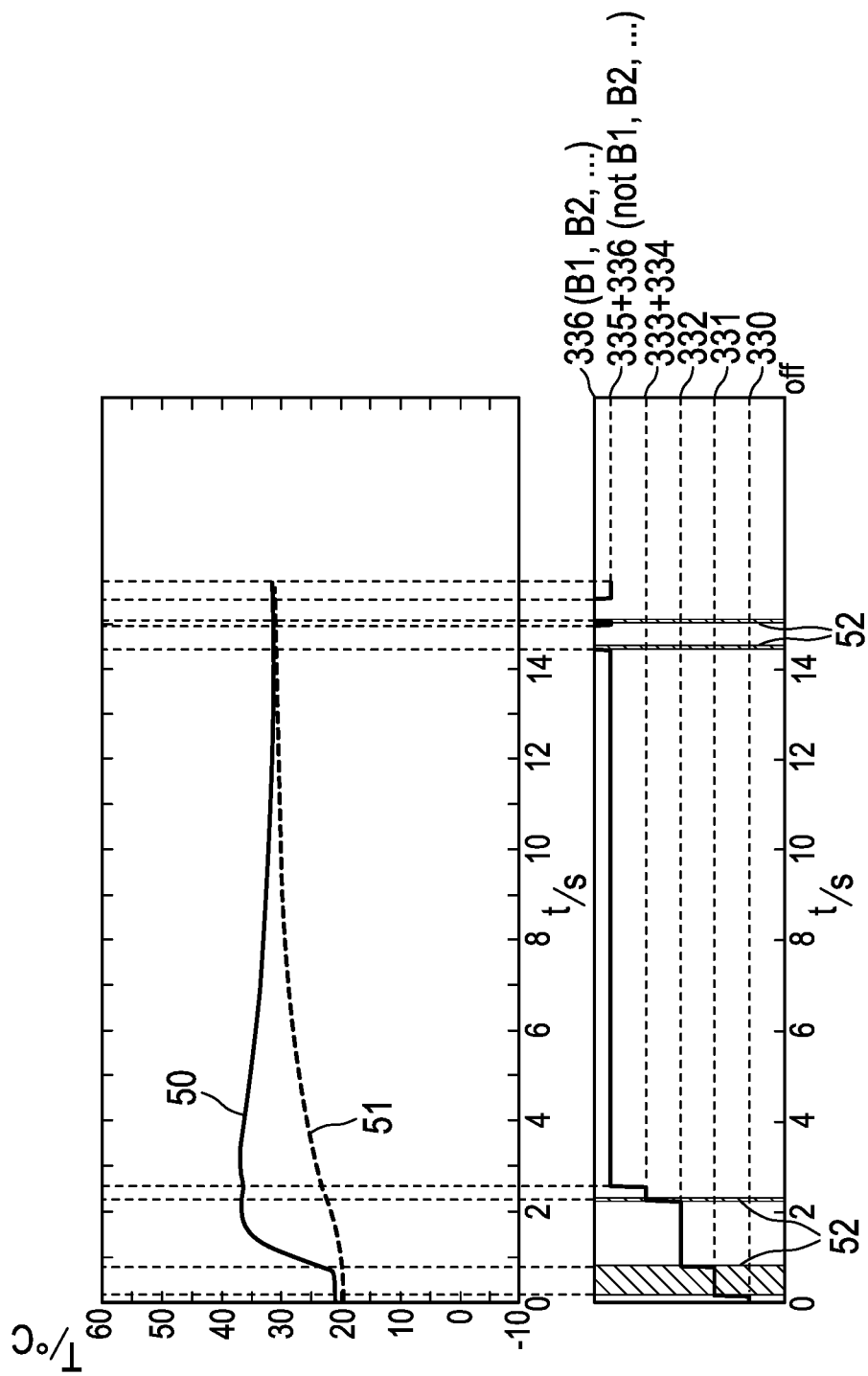
FIG. 5 shows a diagram of an experimentally obtained a first temperature profile and a diagram of the corresponding phases of the heating device.
Figure 6:
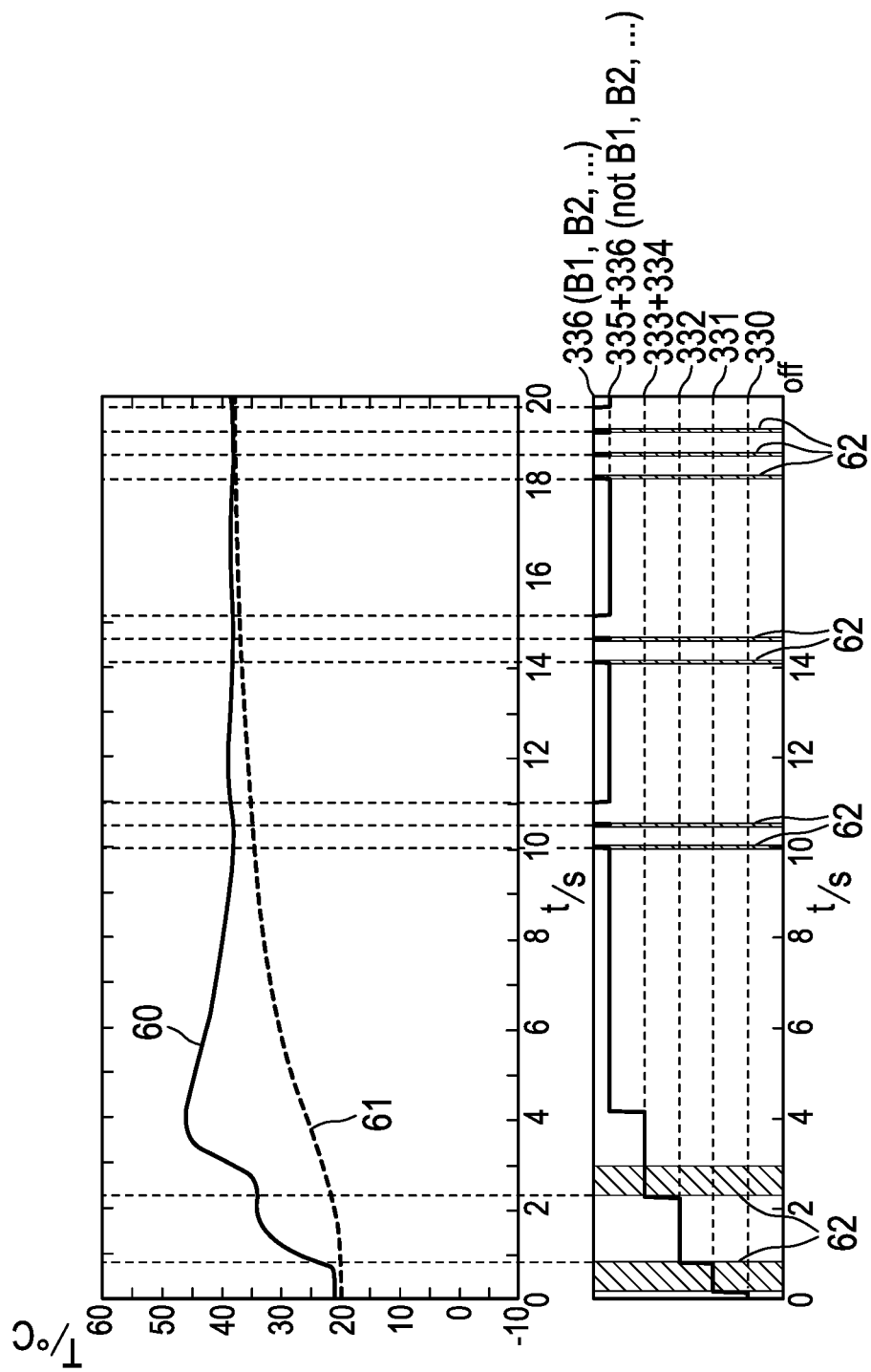
FIG. 6 shows a diagram of an experimentally obtained a first temperature profile and a diagram of the corresponding phases of the heating device.

A first temperature profile of the temperature T over time obtained in a first experiment and a diagram of the corresponding phases of the heating device are shown in FIG. 5. The upper diagram is similar to the diagram shown in FIG. 3 and shows the results of an experiment with 90 ml water (as fluid), 90 ml milk (as food) and a predefined milk temperature of 30° C. The curve 50 represents the temperature profile of the water temperature over time and the curve 51 represents the corresponding milk temperature over time. The lower diagram illustrates the different phases which are performed by the heating device which are referenced by the same numbers as used in FIG. 3. The blocks 52 indicate the times when the heating device is switched on.

A second temperature profile of the temperature T over time obtained in a first experiment and a diagram of the corresponding phases of the heating device are shown in FIG. 5. The upper diagram is similar to the diagram shown in FIG. 3 and shows the results of an experiment with 120 ml water (as fluid), 120 ml milk (as food) and a predefined milk temperature of 37° C. The curve 60 represents the temperature profile of the water temperature over time and the curve 61 represents the corresponding milk temperature over time. The blocks 62 in the lower diagram indicate the times when the heating device is switched on.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A heating device for heating food in a container, comprising:

a chamber for containing a fluid of a given amount and for receiving the container within the fluid contained within the chamber, a heating unit for heating the fluid in the chamber, a temperature measuring element for measuring a temperature of the fluid in the chamber over time to obtain a temperature profile over time of the fluid in the chamber, a power unit for driving the heating unit, and a controller for controlling the heating unit using the power unit for driving the heating unit according to a piecewise heating function having different heating phases that comprise at least one heating phase, at least one overshoot phase, a cooling phase and a thermostat phase, wherein the power unit for driving the heating unit is controlled via the piecewise heating function to ensure that the food reaches a pre-set temperature without overheating the food above the pre-set temperature, further via estimating a time when the food reaches the pre-set temperature by combining a gradient of the fluid temperature of the fluid in the chamber and a heating interval for a corresponding different heating phase of the piecewise heating function, wherein the controller is further configured to control the power unit for driving the heating unit (i) based on the obtained temperature profile over time of the fluid in the chamber and (ii) based on the given amount of fluid within the chamber, wherein the temperature profile over time includes (i) at least one heating phase of the fluid in the chamber, (ii) at least one overshoot phase of the fluid in the chamber, (iii) a cooling phase of the fluid in the chamber, and (iv) a thermostat heating phase of the fluid in the chamber, and wherein the controller is further configured to (i) power ON the heating unit during a first heating phase, wherein a total heating energy provided by the heating unit powered ON during the first heating phase linearly corresponds to a heating time in which heating energy heats up the fluid during the first heating phase and a first overshoot phase, immediately subsequent the first heating phase, (ii) power OFF the heating unit during the first overshoot phase in which heating of the fluid during the first overshoot phase occurs with the heating unit powered OFF, (iii) determine a unique overshoot rate defined as $(T_{w.os}-T_{w min})/(t_{calib}-t_{init})$, where $T_{w.os}$ is a maximum fluid temperature of the first overshoot phase, $T_{w.min}$ is an initial fluid temperature of the first heating phase, $t_{calib}$ is an end time of the first heating phase, and $t_{init}$ is a beginning time of the first heating phase, and (iv) use the overshoot rate to determine a time of heating during a second heating phase, immediately subsequent the first overshoot phase.

2. The heating device according to claim 1, wherein the controller is configured to control at least one selected from the group consisting of a turn-off time, a turn-on time and a power of the power unit for driving the heating unit.

3. The heating device according to claim 1, wherein the controller is configured to control the power unit for driving the heating unit based on a temperature gradient of the temperature profile.

4. The heating device according to claim 1, wherein the controller comprises a processor configured via instructions stored on a non-transitory computer readable medium executable by the processor for causing the processor to estimate the food temperature of the food based on data stored in a look-up table that includes the temperature profile over time of the fluid in the chamber, a temperature gradient of the fluid over time, and at least one selected from the group consisting of a turn-off time and a turn-on time of the power unit for driving the heating unit over time.

5. The heating device according to claim 1, further comprising a first measurement unit for measuring the amount of fluid in the chamber, wherein the controller is further configured to control the power unit for driving the heating unit based on the temperature profile of the fluid and based on the measured amount of fluid.

6. The heating device according to claim 1, further comprising a second measurement unit for measuring at least one selected from the group consisting of (i) the amount of food and (ii) the weight of the food and the container, wherein the controller is configured to control the power unit for driving the heating unit based on the temperature profile of the fluid and based on the measured at least one selected from the group consisting of (i) amount of food and (ii) weight of the food and the container.

7. The heating device according to claim 6, further comprising a user interface for enabling a user to perform at least one selected from the group consisting of (i) to set a desired temperature of the food and (ii) to select a predefined warming program, wherein the user interface is configured to issue information regarding the amount of fluid to be filled in the chamber by using the measurement from the second measurement unit.

8. The heating device according to claim 1, further comprising a detection unit, wherein the detection unit comprises an optical sensor or a camera for detecting one or more properties indicative of a type of the food in the container, wherein the type of food includes (i) white color food or (ii) food of a color other than white, wherein the controller is further configured via instructions stored on a non-transitory computer readable medium executable by the controller for causing the controller to control the power unit for driving the heating unit based on the temperature profile over time of the fluid in the chamber and based on the detected type of the food.

9. The heating device according to claim 1, wherein the controller is further configured to control the power unit for driving the heating unit to perform heating of the fluid in different heating phases.

10. The heating device according to claim 9, wherein the controller is configured to control the power unit for driving the heating unit to perform heating of the fluid in the first heating phase for a predefined time, for a calculated time, until the fluid reaches a first predefined temperature or until the fluid reaches a first temperature, which is by a predefined percentage or absolute value higher than an initial fluid temperature at the beginning of the first heating phase.

11. The heating device according to claim 10, wherein the controller is configured to control the power unit for driving the heating unit to perform heating of the fluid in the second heating phase, which is initiated when the fluid temperature becomes constant, is only rising below a predetermined degree or starts falling after the end of the first heating phase.

12. The heating device according to claim 11, wherein the controller is configured to control the power unit for driving the heating unit to perform heating of the fluid in the second heating phase by heating for a predetermined heating time or until the fluid reaches a second temperature, which is predetermined by a predefined percentage or amount higher than a second initial temperature at the beginning of the second heating phase or than a desired food temperature that after the heating time of the second heating phase the fluid reach an aimed temperature or is close to the aimed temperature.

13. The heating device according to claim 11, wherein the controller is configured to control the power unit for driving the heating unit to perform heating of the fluid in a third heating phase in case the fluid temperature approaches or falls below a predefined or desired temperature of the food by heating the fluid to a temperature above or equal to the predefined or desired temperature of the food.

14. The heating device according to claim 13, wherein the controller is further configured to control the power unit for driving the heating unit to perform heating of the fluid in the third heating phase by repeatedly turning on and off the power unit for driving the heating unit for two or more time intervals until the fluid temperature rises above or reaches the predefined or desired temperature of the food.

15. The heating device according to claim 1, wherein the different heating phases further comprise an initial phase, prior to the at least one heating phase, wherein the controller is configured to start measuring the temperature of the fluid in the chamber with the temperature measuring element without heating the fluid via the heating unit.

16. A heating device for heating food in a container, comprising:
  a chamber for containing a fluid of a given amount and for receiving the container within the fluid contained within the chamber
  a heating unit for heating the fluid in the chamber
  a temperature measuring element for measuring a temperature of the fluid in the chamber over time to obtain a temperature profile over time of the fluid in the chamber,
  a power unit for driving the heating unit, and
  a controller for controlling the heating unit using the power unit for driving the heating unit according to a piecewise heating function having different heating phases that comprise at least one heating phase, at least one overshoot phase, a cooling phase and a thermostat phase, wherein the power unit for driving the heating unit is controlled via the piecewise heating function to ensure that the food reaches a pre-set temperature without overheating the food above the pre-set temperature, further via estimating a time when the food reaches the pre-set temperature by combining a gradient of the fluid temperature of the fluid in the chamber and a heating interval determined by a unique overshoot rate determined by the temperature of the fluid in the chamber for a corresponding different heating phase of the piecewise heating function,
  wherein the controller is further configured to control the power unit for driving the heating unit (i) based on the obtained temperature profile over time of the fluid in the chamber and (ii) based on the given amount of fluid within the chamber,
  wherein the temperature profile over time includes (i) at least one heating phase of the fluid in the chamber, (ii) at least one overshoot phase of the fluid in the chamber, (iii) a cooling phase of the fluid in the chamber, and (iv) a thermostat heating phase of the fluid in the chamber, and
  wherein the controller is further configured to (i) power ON the heating unit during a first heating phase, (ii) power OFF the heating unit during a first overshoot phase, subsequent to the first heating phase, (iii) power ON the heating unit during a second heating phase, subsequent to the first overshoot phase, (iv) power OFF the heating unit during a second overshoot phase, subsequent the second heating phase, (v) power OFF the heating unit during a cooling phase, subsequent the second overshoot phase, and (vi) power ON and power OFF the heating unit in heating boosts to maintain an equilibrium between the fluid temperature and a temperature of the food at the pre-set temperature.

17. The heating device according to claim 16, wherein the first heating phase comprises a calibration heating phase, wherein the calibration heating phase ends in response to a measured fluid temperature having increased by a predetermined value above an initial minimum fluid temperature value measured at a beginning of the calibration heating phase.

18. The heating device according to claim 17, wherein the first overshoot phase begins after the end of the calibration heating phase, wherein during the first overshoot phase, the fluid temperature does not stop increasing although the heating unit is powered OFF, a remaining heating energy goes into the fluid to cause a further increase of the fluid temperature, wherein the first overshoot phase continues until a maximum temperature at which the fluid temperature is no longer increasing, at which time the first overshoot phase ends.

19. The heating device according to claim 18, wherein the controller is further configured to determine a time duration for powering ON the heating unit for heating the fluid during the second heating phase, subsequent the first overshoot phase, based on an overshoot rate determined as a function of a change in fluid temperature during the overshoot phase divided by a time duration of the calibration heating phase, and
  wherein the controller is further configured to power OFF the heating unit for the second overshoot phase, subsequent the second heating phase, wherein during the second overshoot phase, the fluid temperature does not stop increasing although the heating unit is powered OFF, a further remaining heating energy goes into the fluid to cause a further increase of the fluid temperature, wherein the second overshoot phase continues until a further maximum temperature at which the fluid temperature is no longer increasing, at which time the second overshoot phase ends and the cooling phase begins, during which the heating unit is powered OFF, the fluid temperature falls to the pre-set temperature while temperature energy in the fluid enables the food to reach the pre-set temperature.

* * * * *